3,008,880
SPLITTING OF REFLUX TO EXTRACTIVE DISTILLATION COLUMN
Richard G. Dodge, Redondo Beach, and Malcolm L. Sagenkahn, Torrance, Calif., assignors to Shell Oil Company, a corporation of Delaware
Filed June 17, 1958, Ser. No. 742,685
5 Claims. (Cl. 202—39.5)

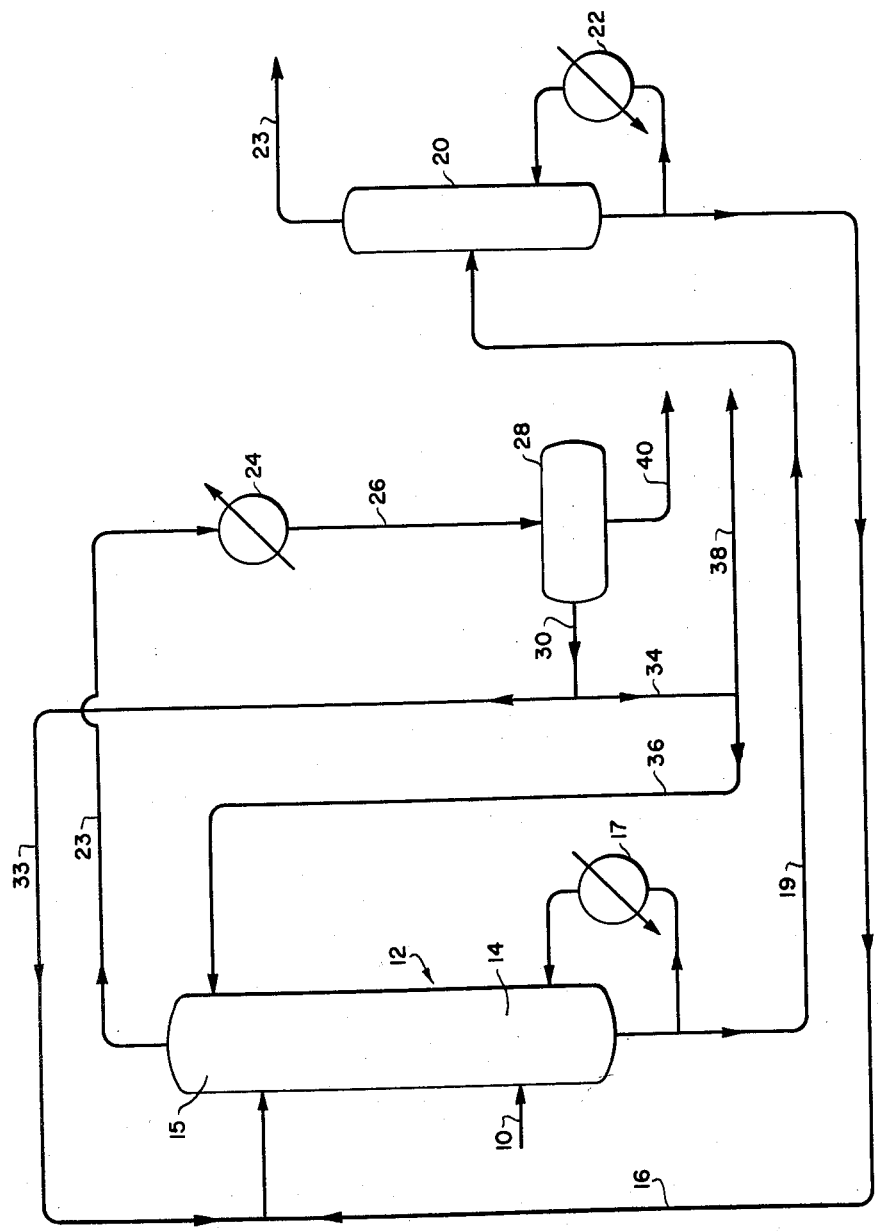
Nov. 14, 1961   R. G. DODGE ET AL   3,008,880
SPLITTING OF REFLUX TO EXTRACTIVE DISTILLATION COLUMN
Filed June 17, 1958
INVENTORS:
MALCOLM L. SAGENKAHN
RICHARD G. DODGE
BY J. Reid Anderson
    THEIR ATTORNEY // # United States Patent Office

This invention relates to solvent extractive distillation and more particularly to an improved method of operating an extractive distillation column to avoid unstable column conditions when striving, for example, for an increased product recovery.

There are organic mixtures, e.g., petroleum fractions and petroleum derived streams having components whose normal volatilities are such that separation of these components cannot be readily achieved with ordinary fractional distillation. Hence, it has been necessary to resort to the more costly process of extractive distillation with a solvent to obtain in the desired separations of these close boiling compounds. The added solvent having a preferential affinity for one or several of the components of the mixture, changes the relative volatilities of the close boiling components to such an extent that fractional distillation then becomes feasible. Extractive distillation processes are widely employed for separating many close boiling mixtures, for instance, in the separation of toluene from its close boiling $C_7$ and $C_8$ paraffins and naphthenes, it becomes expedient to utilize extractive distillation with phenol as the solvent. The problem of separating close boiling materials is also commonly encountered in the separation of mono-olefins from paraffins and diolefins from mono-olefins of the same carbon number. The same difficult separation prevails in isoprene manufacture where compounds of like carbon numbers and different degrees of saturation are separated. Another example of the use of extractive distillation occurs in the manufacture of butadiene in the separation of butenes from saturated butanes. The latter separation has conventionally used a solution of acetone and water but in a recent industrial application an acetonitrile-water solvent has been substituted for the acetone solvent because of its greater selectivity which permits an increased recovery of the olefin.

Apart from the presence of the solvent, extractive distillation closely resembles ordinary fractional distillation and if successful operation of an extractive distillation column is to be had, there must be maintained a single liquid phase within the distillation zone. The presence of two liquid phases is thought to be the chief cause of the unstable column condition sometimes described as "flooding" which interferes with proper separation and reduces product recovery. It is rudimentary to distillation operations generally whether they be of the ordinary type, or a solvent extractive distillation that heat be supplied to the liquid appearing on the several trays of the column in amounts adequate to provide vaporization. Extractive distillation solvents are high boiling and impart increased boiling temperatures to the liquid layers of the several trays. This being so, it is believed that the concurrent presence of a second hydrocarbon phase (having a relatively lower boiling point) along with the higher boiling solvent-hydrocarbon phase results in a flashing of hydrocarbons from the more readily volatilized hydrocarbon phase, causing column instability. Column instability may be evidenced by, for example, first an increase in temperature of the raffinate and a decrease in pressure at the top of the column indicating an increased carryover of solvent, followed by a dropping of the liquid level in the bottom of the column.

Each extractive distillation process has a theoretical feed in solvent solubility (necessarily different for each feed-solvent pair) which must not be exceeded, otherwise two-phase formation will occur, followed by column instability. In the separation of a hydrocarbon mixture, if the miscibility limit should be exceeded, the two phases formed would be a hydrocarbon-solvent phase and a hydrocarbon phase composed of the less soluble hydrocarbons of the mixture. In the case of a butane-butene mixture, the latter phase would be made up of butane since that material is the less soluble. It has developed in plant operation that the theoretical miscibility limit is never actually attained but at the best, only approached.

Column instability frequently occurs where an extractive distillation process is altered in some manner in an attempt to improve recovery. This is understandable as normally a process is operated with the ratio of solvent to hydrocarbon close to the miscibility limit. For example, increased recovery may be sought by improving the selectivity (alpha value) of a water containing solvent such as aqueous acetone or acetonitrile by increasing the water concentration in the solvent. Unfortunately, this increase in water concentration lowers the solubility of the solvent for the hydrocarbon, thus, reducing the theoretical miscibility limit, and hence the improvement in selectivity is somewhat offset by the diluted solvent's lesser solubility for hydrocarbons. Another instance of where column instability may occur is where the reflux rate is increased to obtain improved column performance. Here again, it will be seen the effect of the change is to place the hydrocarbon-solvent ratio closer to the miscibility limit, and in some cases the increased reflux rate may lead to flooding. A third example of where flooding may come about through a change in the operation of an extractive distillation process is where there has been a substitution of a more selective solvent, e.g. acetonitrile, for a solvent having a greater solubility, such as acetone, for the hydrocarbon or other mixture.

It is an object of this invention to provide an extractive distillation process which avoids column instability with a closer approach to the theoretical miscibility limit of the solvent and feed than formerly possible. Another object is to improve column performance obtainable with an increased water content of the solvent, without introducing column instability. A still further object of the invention is to improve column performance via increased reflux rate, again without causing column instability. A still further object is to provide an improved extractive distillation process where the solvent rate may be reduced, thus permitting an increased feed flow if desired or in the possible alternative, a lowering of solvent circulation cost. These and other objects will become more apparent from the description of the invention which will be made with reference to the accompanying drawing which is a flow diagram of a preferred system for the practice of the process.

It has now been discovered that solvent extractive distillation processes may be stabilized against column fluctuation, thereby permitting increased recovery by an improved manner of refluxing. Broadly speaking, it is contemplated in a solvent extractive distillation process where a feed stock is separated into a raffinate phase and an extract phase in a distillation zone, following which the raffinate phase is passed through a rectification zone (to reduce its solvent content) and subsequently condensed, the improvement of splitting the raffinate reflux into at least two portions and separately returning them to the process. One portion of the reflux is returned to the top of the rectification zone and the other portion is admixed with the solvent stream prior to its introduction to the distillation zone. Splitting of the reflux and returning of each portion in the manner indicated is necessary to the successful practice of the process. While the return of all the reflux premixed with the solvent stream without recycling a portion of it to the top of the rectification zone does permit a closer approach to the theoretical miscibility limit, the advantage of the improved process is nevertheless lost as the amount of the solvent escaping with the raffinate becomes objectionably large and for this reason, a portion of the reflux is necessarily returned to the rectification zone. In the case of an extractive distillation system utilizing aqueous acetonitrile, it is recommended that 50 to 85% of the reflux be introduced to the column with the solvent stream. This same range is generally suitable for other extractive distillation systems.

In the preferred embodiment of the improved process as illustrated in the accompanying drawing a stream 10 of a $C_4$ paraffin-olefin feed stock is introduced at a temperature of about 150° F. to a lower portion of a conventional extractive distillation tower 12. An aqueous acetonitrile solvent in a solvent:feed ration of 9:1 and having a temperature of about 190° F. enters the tower, at the top of a distillation zone 14 and immediately below a rectification zone 15 of the tower via a line 16. Preferably, the $C_4$ feed stream is introduced as a vapor or as a liquid just below its boiling point. The feed stock contains olefins (butenes, principally) in the mole fraction range of 50–55%. The aqueous solvent has a water content of 15% by weight.

Heat needed for the operation of a tower is supplied by a reboiler 17. The tower is maintained at a top pressure of about 100 p.s.i.a. and a temperature of approximately 140° F. The hydrocarbon stream passes countercurrent to the descending liquid solvent which selectivity extracts the butene from the butane to form a solvent extract phase which is removed from the base of the tower via a line 19 and passed to a solvent stripping tower 20 of conventional design. The heat for the operation of the latter tower is provided by a reboiler 22. The butene product leaves overhead from the tower in a line 23 and the stripped solvent is removed from the base thereof in the aforementioned line 16 and returned to the extractive distillation column.

The raffinate comprising chiefly butane and containing some water and acetonitrile solvent passes from the distillatoin zone 14 into the overlying rectification zone 15. The latter zone is provided with several trays, say three to five trays, adequate in number to achieve a tolerable separation of the acetonitrile solvent from the hydrocarbon. The raffinate is removed from the extractive distillation column in a line 23 which opens into a condenser 24 where the raffinate vapor is condensed to provide a condensate which flows through a line 26 to an accumulator 28. Here the condensate separates into an upper hydrocarbon enriched layer and into an underlying water rich layer. The former layer leaves the accumulator in a line 30 which branches into a reflux line 33 and a line 34. The latter line in turn divides into a second reflux line 36 and a product line 38. The first mentioned reflux line 33 opens into the solvent recycle line 16 at some distance preceding the extractive distillation column. The reflux:solvent ratio in the instant example is approximately 1:3.4 and 70% of the reflux is returned to the solvent inlet line 16. The distance of the common flow of the reflux and solvent in the line 16 is sufficient to insure a thorough mixing of the two materials before the combined stream empties upon the tray forming the boundary line between the two zones of the column. This premixing of the solvent and reflux prior to their introduction to the extractive distillation column lessens the likelihood of two-phase formation within the column, provding a more stable column operation which in turn permits the use of the aqueous acetonitrile solvent of 15% weight water compared to a normal water concentration of about 10%. Column instability could normally be expected to occur where the water percentage exceeds about 10%, for these process conditions and flow rates. The use of the higher concentration water solvent provides a significant increase of about 5% in butene recovery. The water phase layer and the hydrocarbon layer are removed respectively through lines 40 and 38 to further conventional processing.

In a $C_4$ system, particularly when using acetonitrile as the extractive distillation solvent, miscibility limits are very close, near the top of the column where the butane content is the highest. The process of the invention improves the miscibility limits in this area and with the rest of the column being far removed from this miscibility problem, there is no danger of phase separation.

The increased product recovery possible with the improved manner of refluxing may be obtained in various ways, for example, the increased recovery may be sought by improving the selectivity of the solvent by increasing its water concentration. Another approach that becomes possible with the more stabilized column conditions furnished by the split reflux is an increase in the reflux:feed ratio, which likewise raises product recovery. It is also permissible with the use of the improved manner of refluxing to increase product recovery by an increased feed flow to the extent that it becomes possible to reduce solvent flow. The process is of particular value in the changeover of an existing installation to use a more selective but less soluble solvent in an effort to increase product recovery without a change in the size of the physical equipment. For instance, acetonitrile has a much greater effect on enhancing the relative volatility (alpha value) of a saturated hydrocarbon with respect to its unsaturated counterpart than does the more commonly used acetone solvent. However, this improved relative volatility is somewhat offset by the acetonitrile's lesser solubility for the feed stock. But fortunately, with the practice of the improved manner of refluxing, it becomes possible to approach more closely the theoretical miscibility limit and thereby to benefit more fully from the substitution of that more selective solvent.

We claim as our invention:

1. In the extractive distillation in a distillation zone of mixtures of $C_4$ to $C_5$ hydrocarbons of like carbon number and of different degrees of saturation utilizing acetonitrile as selective solvent for the more unsaturated hydrocarbon in the mixture and wherein raffinate and extract of lesser and greater degrees of unsaturation respectively are separated and wherein a portion of separated raffinate material is returned to the top of the distillation zone as reflux and solvent is supplied to the distillation zone at a point thereof below the reflux, the improvement which comprises returning from 50 to 85% of the reflux to the distillation zone by first admixing it external to the distillation zone with the entire solvent stream fed to the distillation zone while returning the remainder of the reflux to the top of the distillation zone separate from solvent.

2. Extractive distillation of mixtures as set forth in claim 1 wherein $C_4$ hydrocarbons of different degrees of saturation are separated from each other.

3. Extractive distillation of mixtures as set forth in claim 1 wherein $C_5$ hydrocarbons of different degrees of saturation are separated from each other.

4. Extractive distillation of hydrocarbon mixtures as in claim 1 wherein aqueous acetonitrile is used as selective solvent.

5. Extractive distillation of hydrocarbon mixtures as set forth in claim 1 wherein 70% of the reflux is returned to the distillation zone by first admixing it external to the distillation zone with the entire solvent stream fed thereto.

References Cited in the file of this patent

UNITED STATES PATENTS

| | | |
|---|---|---|
| 2,379,696 | Evans | July 3, 1945 |
| 2,494,274 | Woerner | Jan. 10, 1950 |
| 2,520,006 | Hibshman et al. | Aug. 22, 1950 |
| 2,788,315 | Morrell et al. | Apr. 9, 1957 |
| 2,828,249 | Maze-Sencier et al. | Mar. 25, 1958 |